(12) United States Patent
Walton et al.

(10) Patent No.: US 6,774,977 B1
(45) Date of Patent: Aug. 10, 2004

(54) LIQUID CRYSTAL DEVICE AND DISPLAY

(75) Inventors: Harry Garth Walton, Oxford (GB); Michael John Towler, Oxford (GB)

(73) Assignee: Sharp Laboratories of Europe Limited, Oxfordshire (GB)

( * ) Notice: Subject to any disclaimer, the term of this patent is extended or adjusted under 35 U.S.C. 154(b) by 61 days.

(21) Appl. No.: 10/088,788

(22) PCT Filed: Sep. 26, 2000

(86) PCT No.: PCT/GB00/03694

§ 371 (c)(1),
(2), (4) Date: Jun. 7, 2002

(87) PCT Pub. No.: WO01/23953

PCT Pub. Date: Apr. 5, 2001

(30) Foreign Application Priority Data

Sep. 28, 1999 (GB) .............................................. 9922792

(51) Int. Cl.$^7$ .............................................. C09K 19/02
(52) U.S. Cl. ....................... 349/177; 349/179; 349/180; 349/181; 349/182; 349/184; 349/186
(58) Field of Search ................................ 349/179, 180, 349/181, 182, 186, 184, 177

(56) References Cited

U.S. PATENT DOCUMENTS

| | | | | |
|---|---|---|---|---|
| 4,482,472 A | * | 11/1984 | Carr et al. ................ | 252/299.1 |
| 5,337,174 A | | 8/1994 | Wada et al. .................. | 359/73 |
| 5,380,459 A | | 1/1995 | Kanemoto et al. ..... | 252/299.01 |
| 5,472,635 A | | 12/1995 | Iida et al. .............. | 252/299.01 |
| 6,351,301 B1 | * | 2/2002 | Takatori ..................... | 349/172 |

OTHER PUBLICATIONS

Taiwan Office Action dated May 7, 2003.
Armitage et al.: "Nematic Liquid–Crystal Viscocity and Response Time"; *Journal of the Society for Information Display*; San Jose, US, vol. 27, 1996, pp. 54–587, XP000960529; ISSN: 1071–0922.

Onda et al.; "Dynamic Behavior of OCB–Cell with Fast Response for a Color Sequential Liquid Crystal Display"; Proceedings of the 18$^{th}$International Display Research Conference (Asia Display '98 ), Seoul, South Korea, Sep. 28—Oct. 1 1998, pp. 1055–1058, XP002155364 USA.

Kneppe et al.; "Determination of the Viscosity Coefficients of the Liquid Crystal MBBA"; *Molecular Crystals and Liquid Crystals*, 1981, UK, vol. 65, No. 1–2, pp. 23–28, XP000972577; ISSN: 0026–8941.

C.S. Oh; "Induced Smectic Mesomorphism by Incompatible Nemaogens"; *Molecular Crystals and Liquid Crystals and Liquid Crystals*, Gordon and Breach, London, GB, vol. 42, No. 1–03, 1977, pp. 1–14, OX000964547; ISSN: 0026–8941.

Bradshaw et al.; "The Bend and Splay Elastic Constants on Approaching an Injected Smectic Phase"; *Molecular Crystals and Liquid Crystals*, Gordon and Breach, London, GB, vol. 99, No. 1–04, 1983, pp. 107–116, XP000964602; ISSN: 0026–8941.

Graf et al.; "Shear and Rotational Viscosity Coefficients of Two Nematic Liquid Crystals"; *Molecular Physics*, London, GB, vol. 22, No. 3, Oct. 20, 1992, pp. 521–538, XP000964546.

* cited by examiner

*Primary Examiner*—Tarifur R. Chowdhury
*Assistant Examiner*—George Y. Wang
(74) *Attorney, Agent, or Firm*—Renner, Otto, Boisselle & Sklar, LLP (57) ABSTRACT

A surface mode liquid crystal device, for example of the pi-cell type, comprises a layer nematic liquid crystal (10) disposed between alignment layers (4,9) and an electrode arrangement (3,8). The nematic liquid crystal has viscosity coefficients $\eta_1$, $\eta_2$ and $\gamma_1$, such that $(\eta_1-\eta_2)/\gamma_1 \geq 1.15$ or $(\eta_1-\eta_2)/\gamma_1 \leq 0.9$.

12 Claims, 6 Drawing Sheets

(arrows denote shear directions)

FIG 1

(arrows denote shear directions)

LIQUID CRYSTAL DEVICE AND DISPLAY

The present invention relates to a liquid crystal device and to a display incorporating such a device. Such a display may, for example, be used in the fields of television, computer monitors, flat screen devices and image processing devices.

Liquid crystals are materials characterised in part by molecules of anisotropic (i.e. non-spherical) shape. In liquids, molecules lack ordering. In crystals, molecules are both orientationally and positionally ordered. In liquid crystals, molecules show ordering which is intermediate between that of a liquid and that of a true crystal. A number of different liquid crystals phases exist. The nematic liquid crystal phase is characterised by anisotropic molecules showing some degree of orientational alignment, but lacking relative positional order. In smectic liquid crystal phases, molecules show some orientional order and also some positional order but in a limited number of spatial directions.

The actual phase occuring for a liquid crystal material depends on temperature. At high temperatures (approximately above 100° C. for many materials used in display devices) all order is lost and the material becomes an isotropic liquid. As temperature is reduced materials commonly used in display devices undergo a transition to a nematic phase. As temperature reduces still further, a transition to a smectic phase or to a true crystal phase can occur at low temperature.

A known type of display, for example as disclosed in U.S. Pat. Nos. 4,566,758 and 4,635,051, comprises a "pi-cell". A layer of nematic liquid crystal is disposed between alignment layers which provide parallel alignment and low pre-tilt, typically less than 10°. The nematic liquid crystal has positive dielectric anisotropy. The state of the liquid crystal directors in the layer is controlled by an electrode structure, for example of pixelated active matrix addressing type In such a liquid crystal display, each pixel is operated over a predetermined voltage range. The liquid crystal director in the central region of the liquid crystal layer remains substantially perpendicular to the plane of the alignment layers at all voltages within the range of operation, whereas the liquid crystal director in the surface regions close to the alignment layers undergoes reorientation as the applied voltage is varied. Such a device is known as a "surface mode device" because switching occurs in the surface regions adjacent to the alignment layers whereas little or no switching occurs in the bulk of the liquid crystal.

Because, as is well known, liquid crystals are optically anisotropic ("birefringent"), a polarised beam of light passing through a liquid crystal will in general suffer some change in its polarisation state. Use of a liquid crystal in conjunction with optical polarisers therefore allows for the construction of an optical shutter, which in turn can form the basis of an optical display system. For a surface mode device, the thickness of the liquid crystal layer is typically chosen such that the optical retardation of the system varies by a half wave over the range of operating voltage of the device in the case of a transmissive display, or by a quarter wave in the case of a reflection mode device.

Another known type of surface mode device is disclosed in WO 97/12275. In this device, a negative dielectric anisotropy nematic liquid crystal layer is disposed between alignment layers which provide a very high pre-tilt, typically greater than 80°. The liquid crystal in the bulk of the layer is aligned so that the liquid crystal directors are substantially parallel to the alignment layers. Switching of the liquid crystal director occurs predominantly in the near-surface regions of the device when the applied field is switched between two predetermined values. The variation of the applied field causes a variation in the amount of splay distortion of the director in the near-surface regions. Such a device thus operates as a variable retarder as in the case of the pi-cell.

According to a first aspect of the invention, there is provided a surface mode liquid crystal device comprising a layer of nematic liquid crystal having viscosity coefficients $\eta_1$, $\eta_2$ and $\gamma_1$ such that $(\eta_1-\eta_2)/\gamma_1 \geq 1.15$ or $(\eta_1-\eta_2)/\gamma \leq 0.9$.

According to a second aspect of the invention, there is provided a liquid crystal device comprising a layer of nematic liquid crystal having viscosity coefficients $\eta_1$, $\eta_2$ and $\gamma_1$ such that $(\eta_1-\eta_2)/\gamma_1 \geq 1.15$ or $(\eta_1-\eta_2)/\gamma_1 \leq 0.9$ at a temperature such that the liquid crystal is at least 5° C. away from a transition to another phase.

The other phase may be a smectic phase.

The liquid crystal may show a nematic phase at at least one temperature in the range of 0–60° C.

Unlike conventional liquids whose viscosity at a given temperature is determined by a single number, the description of the dynamic behaviour of a nematic liquid crystal requires that five viscosity coefficients be specified. These viscosity coefficients are generally referred to as $\eta_1$, $\eta_2$, $\eta_3$, $\eta_{12}$ and $\gamma_1$ and are described in F. M. Leslie, Quart. J. Mech. Appl. Math 19, pp. 357 (1966); F. M. Leslie, Arch. Ratio. Mech. Anal. 28, pp. 265 (1968); and M. Miesowicz Bull. Inten. Acad. Polon. Ser. A, 228, 1936, the contents of which are incorporated herein by reference. A physical understanding of the nature of the viscosities $\eta_1$, $\eta_2$, $\eta_3$, $\eta_{12}$, $\gamma_1$ can be gained with reference to FIG. 1 of the accompanying drawings.

Figure 1:
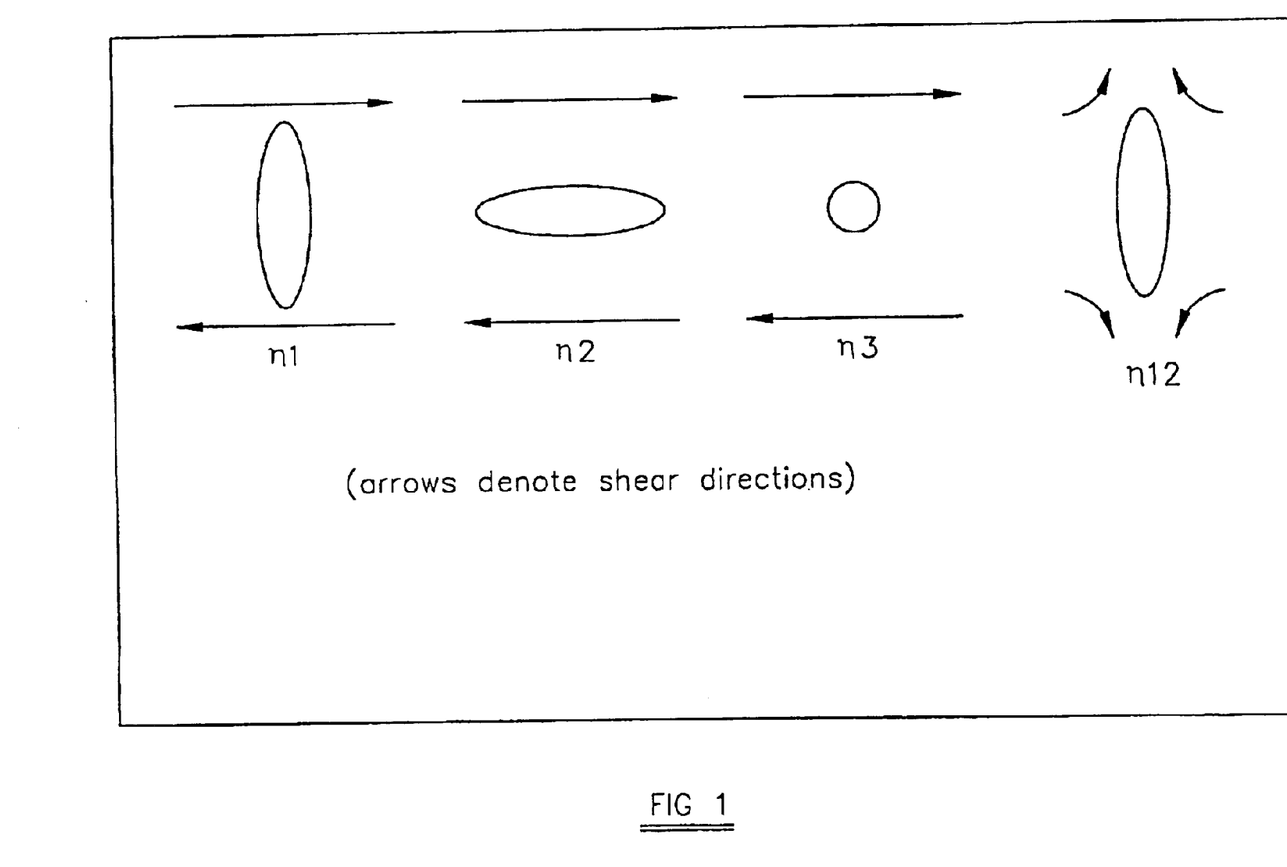
FIG. 1 is a diagram illustrating the nature of liquid crystal viscosities.

Consider an idealised experiment in which a uniformly aligned nematic lies between two parallel plates. The plates are sheared (i.e. displaced with respect to one another) whilst remaining parallel. The ease with which the plates are sheared is clearly related to the viscosity of the nematic between the plates, which in turn will depend upon the orientation of the nematic director between the plates. A variation of flow velocity will occur normal to the plate surfaces. If we consider a situation in which the nematic orientation does not alter during the shearing process, there are evidently a number of fundamental situations (see FIG. 1), each involving a viscosity coefficient, namely:

Director parallel to velocity gradient: $\eta_1$
Director parallel to flow direction: $\eta_2$
Director normal to shear plane: $\eta_3$ A more mathematically rigorous approach shows that we must also include a fourth viscosity, $\eta_{12}$, describing a stretch-type deformation.

Finally, we must introduce a viscosity ($\gamma_1$) which describes situations in which the orientation of the nematic is not fixed, where instead a region rotates with respect to the remainder of the system.

Any dynamic motion of a nematic can be described in terms of these five viscosity coefficients. These viscosities can be experimentally determined through an experiment such as described by Ch. Gahwiller "Direct Determination of the Five Independent Viscosity Coefficients of Nematic Liquid Crystals", Molecular Crystals and Liquid Crystals, 1973, Vol. 20, pp. 301–318. Once the coefficients are known for a nematic, their use in the theory of Leslie can produce a detailed understanding of the motion and response of a nematic liquid crystal to an applied voltage.

It has been found that a particular, non-obvious, relationship between three of the five coefficients has advantage for the response of speed of the particular liquid crystal devices such as the pi-cell and the analagous device described in WO 97112275.

Figure 2:
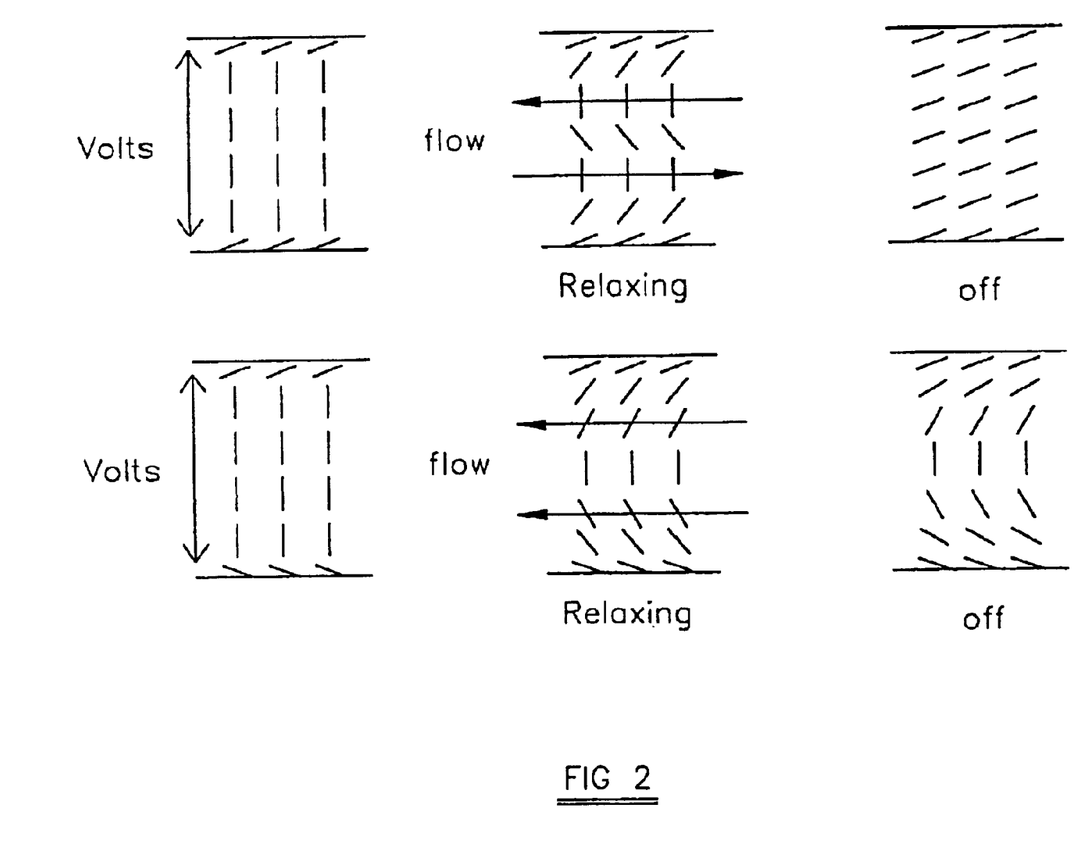
FIG. 2 is a diagram illustrating relaxation in two liquid crystal cells of different alignment.

In "The pi-cell: A fast liquid-crystal optical switching device", P. J. Bos and K. R. Koehler/Beran", Mol. Cryst. Liq. Cryst., 1984, Vol. 113, pp. 329–339, the authors point out that the pi-cell (a device in which the pretilt points in the same direction on both surfaces) has a speed advantage over a device with oppositely directed pretilt at both surfaces. FIG. 2 of the accompanying drawings illustrates this.

As shown in the upper row of FIG. 2, when a voltage is removed from a device with anti-parallel pretilt the subsequent relaxation of the director causes a "backwards" torque on the director in the centre of the cell. This torque slows down the cell relaxation.

As shown in the lower row of FIG. 2, in a pi-cell with parallel pretilt, no such "backwards" torque is produced in the centre of the cell and hence this device relaxes more quickly.

Bos. et. al. do not teach how a correct choice of viscosity coefficients can maximise the speed of the pi-cell. A detailed analysis has enabled us to show that maximum speed is obtained for a pi-cell when the parameter $(\eta_1-\eta_2)/\gamma_1$ has a value which departs significantly from unity.

It is known for the parameter $(\eta_1-\eta_2)/\gamma_1$ of nematic liquid crystals to have a value of 1.0 or close thereto. This parameter is theoretically predicted to have a value of 1.0 and this has been confirmed experimentally for a wide range of nematic liquid crystal materials, for example as disclosed in D. Armitage and J. Larimer, SID 96 Digest, pp. 584 (1996). It has been found that, by selecting this parameter to be substantially different from one, the switching speed and temperature response of a surface mode liquid crystal device can be varied, for example so as to provide more rapid switching speeds for video display panels or for field-sequential video display panels. Selection of this parameter also allows devices to be provided for operation over wide temperature ranges such as in-car displays and portable outdoor display devices (for example personal organisers). The prior art does not disclose the role of nematic viscosities in surface mode device switching.

The nematic liquid crystal may have an underlying smectic phase.

The liquid crystal layer may comprise a polymer network formed by polymerisation of a polymerisable material with the layer cooled to a temperature at which the nematic liquid crystal has a smectic phase.

The liquid crystal may have positive dielectric anisotropy and may be disposed between first and second alignment layers providing substantially parallel alignment and a pretilt less than 45° The pretilt may be less than 10°.

The liquid crystal may have negative dielectric anisotropy and may be disposed between first and second alignment layers providing substantially parallel alignment and a pretilt greater than 45°, preferably greater than 80°.

$(\eta_1-\eta_2)/\gamma$ may be less than zero.

According to a third aspect of the invention, there is provided a display comprising a device according to the first or second aspect of the invention.

The invention will be further described, by way of example, with reference to the accompanying drawings, in which:

FIG. 4 is a diagram illustrating the orientations of various axes of the display of. FIG. 3;

Like reference numerals refer to like parts throughout the drawings.

Figure 3:
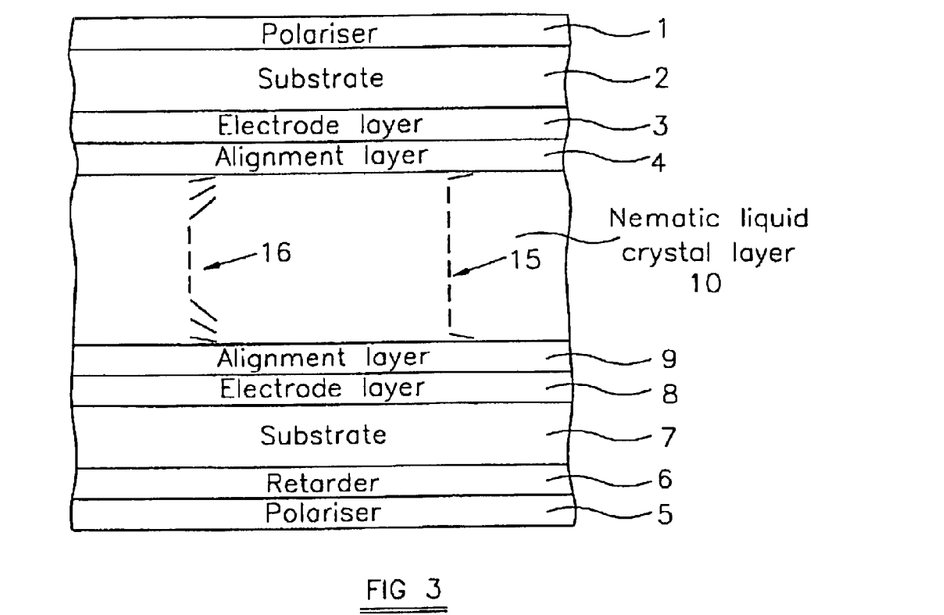
FIG. 3 is a cross sectional diagrammatic view of part of a surface mode liquid crystal display constituting an embodiment of the invention.

FIG. 3 illustrates a transmission mode liquid crystal display of the pill type. The display comprises a polariser 1 disposed on the external surface of a substrate 2, for example of glass. An electrode layer 3 is formed on the internal surface of the substrate 2 and, for example, forms part of an active matrix addressing arrangement including transparent electrodes, for example of indium tin oxide (ITO). An alignment layer 4, for example of rubbed polyimide, is formed on the electrode layer 3.

A polariser 5 and a retarder 6 are disposed on the external surface of a substrate 7 whose internal surface carries an electrode layer 8 which cooperates with the electrode layer 3 to provide the appropriate addressing of picture elements (pixels) of the display. An alignment layer 9, for example of rubbed polyimide, is formed on the electrode layer 8.

The alignment layers 4 and 9 are spaced apart by spacers (not shown) and the gap therebetween is filled with a nematic liquid crystal layer 10. The liquid crystal 10 is of positive dielectric anisotropy and the alignment layers 4 and 9 are oriented so as to provide parallel alignment with a low pre-tilt, for example of about 5°. In a typical example of such a display, the layer 10 has a thickness of 7 micrometres and the nematic liquid crystal has dielectric constants $\epsilon\|=14.1$, $\epsilon\perp=4.1$, refractive indices $n_o=1.4895$, $n_c=1.6122$ and elastic constants K11=K22=K33=10pn.

Figure 4:
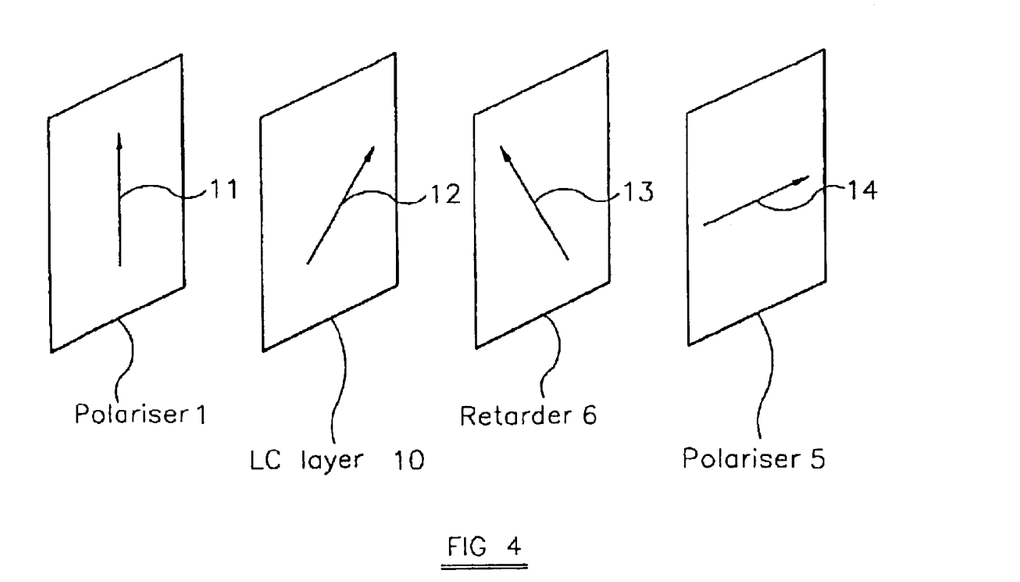

As shown in FIG. 4, the polariser 1 has a vertical polarisation axis 11 (i.e. oriented at 0°), the liquid crystal layer 10 has an optic axis 12 (parallel to the alignment direction of the liquid crystal layer) oriented at +45°, the retarder 6 has an optic axis 13 oriented at −45 and the polariser 5 has a polarisation axis 14 oriented at 90° i.e. perpendicular to tile polarisation axis 11 of the polariser 1. The electrode layers 3 and 8 are arranged to apply voltages across the alignment layers 4 and 9 and the liquid crystal layer 10 which arc switchable between and 8 volts and 2 volts so as to switch the display pixels between a dark or highly attenuating state and a bright or highly transmissive state.

The effect of the 8 volt field on the liquid crystal layer 10 is illustrated at 15. Most of the liquid crystal material is in a state such that the directors are substantially perpendicular to the alignment layers 4 and 9. The liquid crystal layer 10 thus exhibits relatively small residual retardation. The retardation of the retarder 6 is chosen to be substantially equal to the residual retardation and, because the optic axes 12 and 13 of the liquid crystal layer 10 and the retarder 6 are perpendicular to each other, the retarder 6 effectively cancels out the residual retardation of the layer 10 so that the device exhibits substantially zero retardation between the polarisers 1 and 5. Thus, when a pixel is in this state, it acts like crossed polarisers and is therefore substantially opaque so that the pixel appears black.

The effect of the lower applied field on the layer 10 is illustrated at 16. The directors of the surface liquid crystal adjacent the alignment layers 4 and 9 are tilted away from the 90° orientation of the directors of the bulk of the layer 10. The retardation of the layer 10 is therefore substantially higher and is arranged to provide, in combination with the retardation of the retarder 6, substantially a half wave of retardation, for example for light of a wavelength of 550 nanometres approximately at the middle of the visible spectrum. The effect of this is to form a half wave retarder between the crossed polarisers 1 and 5 with the optic axes being oriented at 45° to the polarisation axes 11 and 14. Thus, the polarisation vector of light from the polariser 1 is switched to 90° and is therefore passed by the polariser 5 with minimum attenuation. A pixel in this state thus appears white.

Figure 5:
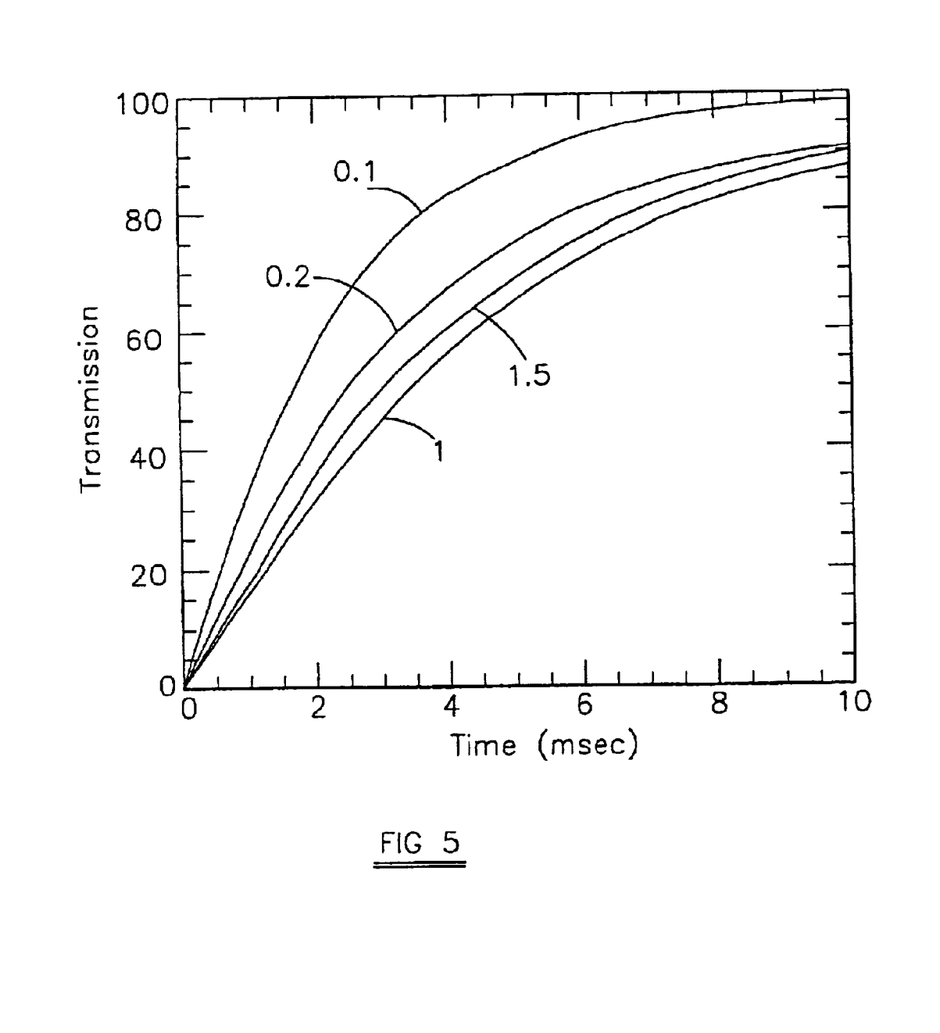
FIG. 5 is a graph of transmission against time for a device of the type shown in FIG. 3 when relaxing from a h high applied field to a tow applied filed.

FIG. 5 illustrates transmission through a pixel of the device of FIGS. 3 and 4 as a percentage against time in milliseconds when the pixel is switched from the black state to the white state i.e. the applied field is reduced from 8 volts to 2 volts Several "electro-optic relaxation curves" are illustrated for different values of the parameter $(\eta_1-\eta_2)/\gamma_1$. For each of these curves, the ratio $\eta_2/\gamma_1$ is equal to 0.25 and the ratio $\eta_{12}/\eta_1$ is equal to 0.1.

The curve for the parameter value of 1 corresponds to known pi-cell arrangements and indicates a switching time in the "relaxation" direction of approximately 10 milliseconds to reach approximately 90% transmission, corresponding to the relaxation of the liquid crystal directors in the surface layers of the liquid crystal layer 10. The other curves illustrate different values of this parameter which, in accordance with the present invention, is greater than 1.15 or less than 0.9. In all such cases, the relaxation time is reduced so that the switching speed is increased. For example, for a parameter value of 0.1, the switching time is reduced to approximately 5 milliseconds to reach approximately 90% transmission. It is therefore possible to increase substantially the refresh rate of a display of the surface mode type and this allows, for example, video rate displays and colour-sequential displays operating at standard frame or field rates to be provided or to give improved performance.

As described hereinbefore, many nematic materials are such that the parameter $(\eta_1-\eta_2)/\gamma_1$ is equal or substantially equal to 1. However, an exception to this occurs when a nematic material is at a temperature close to a phase transition to a smectic phase, for example as disclosed in H.-H. Graf, H. Kneppe, F. Schneider, Mol. Phys. 65, pp. 23–38, 1981. Thus, nematic materials having an underlying smectic phase are particularly suitable for use in the display shown in FIGS. 3 and 4. Of particular interest are materials with so-called "injected smectic phases", for example as disclosed in M. J. Bradshaw, E. P. Raynes, Mol. Cryst Liq. Cryst. 99, pp. 107 (1983). Pi-cells of the type shown in FIGS. 3 and 4 using such materials may therefore be expected to show unusual temperature dependence of their viscosities through their advantageous i.e. non-unity, values of the parameter $(\eta_1-\eta_2)\gamma_1$.

Figure 6:
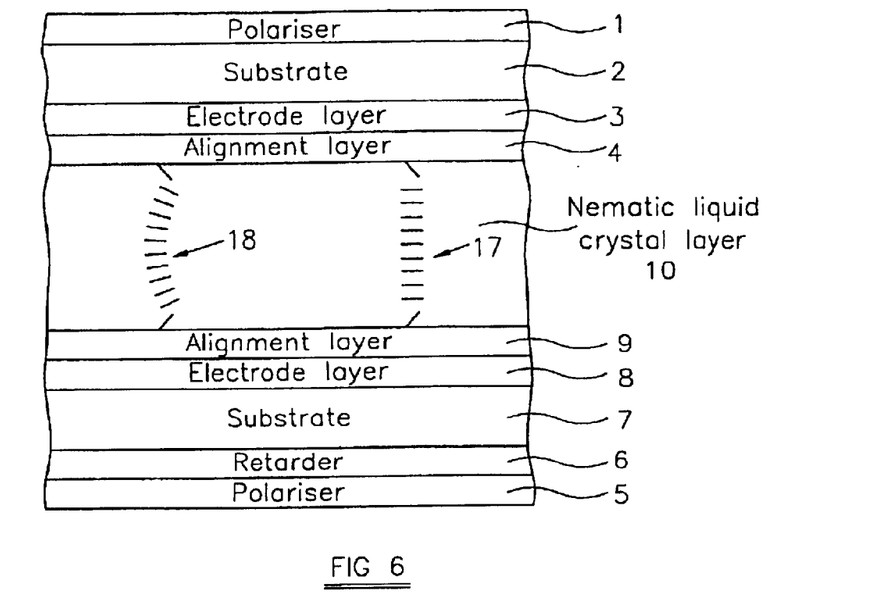
FIG. 6 is a cross sectional diagrammatic view of part of another surface mode liquid crystal display constituting another embodiment of the invention.
Figure 7:
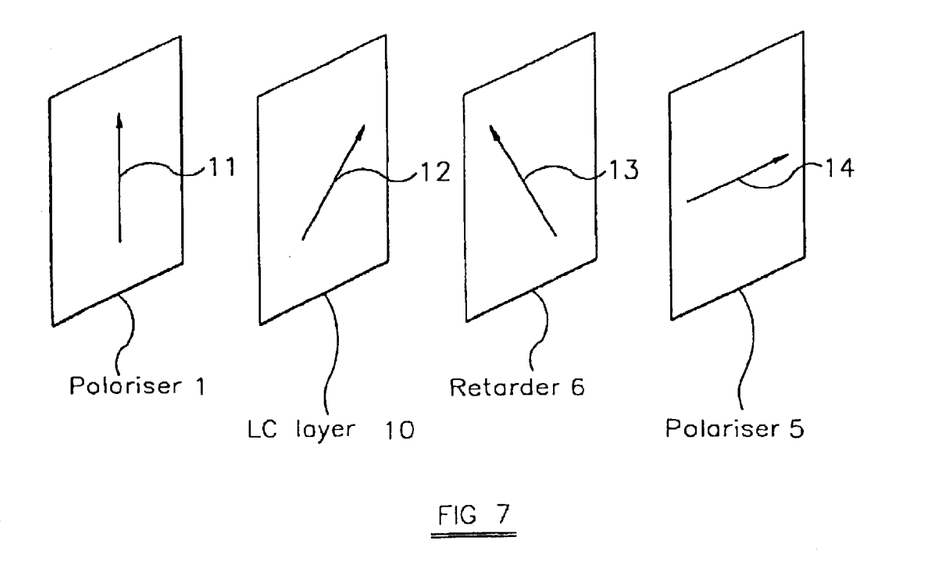
FIG. 7 is a diagram illustrating the orientations of various axes of the display of FIG. 6.

FIGS. 6 and 7 correspond to FIGS. 3 and 4, respectively but illustrate a surface mode device of the type disclosed in WO 97/12275 having a nematic liquid crystal layer 10 with a non-unity parameter $(\eta_1-\eta_2)\gamma_1$. The effect on the liquid crystal director profile throughout the liquid crystal layer 10 is illustrated for a relatively high applied field at 17 and for a relatively low applied field at 18. The display of FIG. 6 differs from that of FIG. 3 in that the nematic liquid crystal is of negative dielectric anisotropy and the alignment layers 4 and 9 provide relatively high pre-tilts, for example greater than 80°.

When a pixel is switched from the high field state shown at 17 to the lower field state shown at 18, the directors in the surface layers of the layer 10 relax so as to switch the pixel from a black state to a white state. By selecting the nematic liquid crystal material of the layer 10 to have a parameter $(\eta_1-\eta_2)\gamma_1$ which is substantially different from 1, the relaxation time is reduced so that the switching speed is increased.

As described hereinbefore, it is found experimentally that most nematic materials are such that the parameter $(\eta_1-\eta_2)$ $\gamma_1$ is equal or substantially equal to one. An argument for this can be given as follows.

From FIG. 1, since $\eta_1$ is the viscosity for shear motion with molecules parallel to the velocity gradient and since $\eta_2$ is the viscosity for molecules parallel to the flow direction, it is apparent that the difference $(\eta_1-\eta_2)$ is in some sense a measure of the shape anisotropy (i.e. ellipticity) of the nematic molecules (in the limit of the molecules being spherical, clearly $\eta_1=\eta_2$). As previously stated, $\gamma_1$ is a measure of how easily a small region of nematic molecules can rotate with respect to their neighbours. Thus, $\gamma_1$ is also a measure of the ellipticity of molecules (put simply, it is easier to rotate one sphere confined amongst neighbours, than to rotate a long thin rod amongst other rods). Thus, in a general sense both $\gamma_1$ and $(\eta_1-\eta_2)$ are measures of the same underlying property of nematic liquid crystals, namely the elliptical nature of the phase, and hence the ratio $(\eta_1-\eta_2)/\gamma_1$ will tend to be of order unity.

Thus, a search for nematic materials with $(\eta_1-\eta_2)/\gamma_1 \neq 1$ is non-obvious (as, in addition, is their use in pi-cells). A method for achieving such materials is to search for unusual shapes of molecule or molecular ordering. Although not stated by the authors, a close examination of the results of H.-H. Graf, H. Kneppe, F. Schneider, Mol. Phys. 65, pp 23–28, 1981, shows that a nematic material at a temperature close to a phase transition to a smectic phase can display $(\eta_1-\eta_2)/\gamma_1 \neq 1$. Thus, nematic materials with an underlying, or overlying, smectic phase can display the required anomalous $(\eta_1-\eta_2)/\gamma_1$ behaviour.

Figure 8:
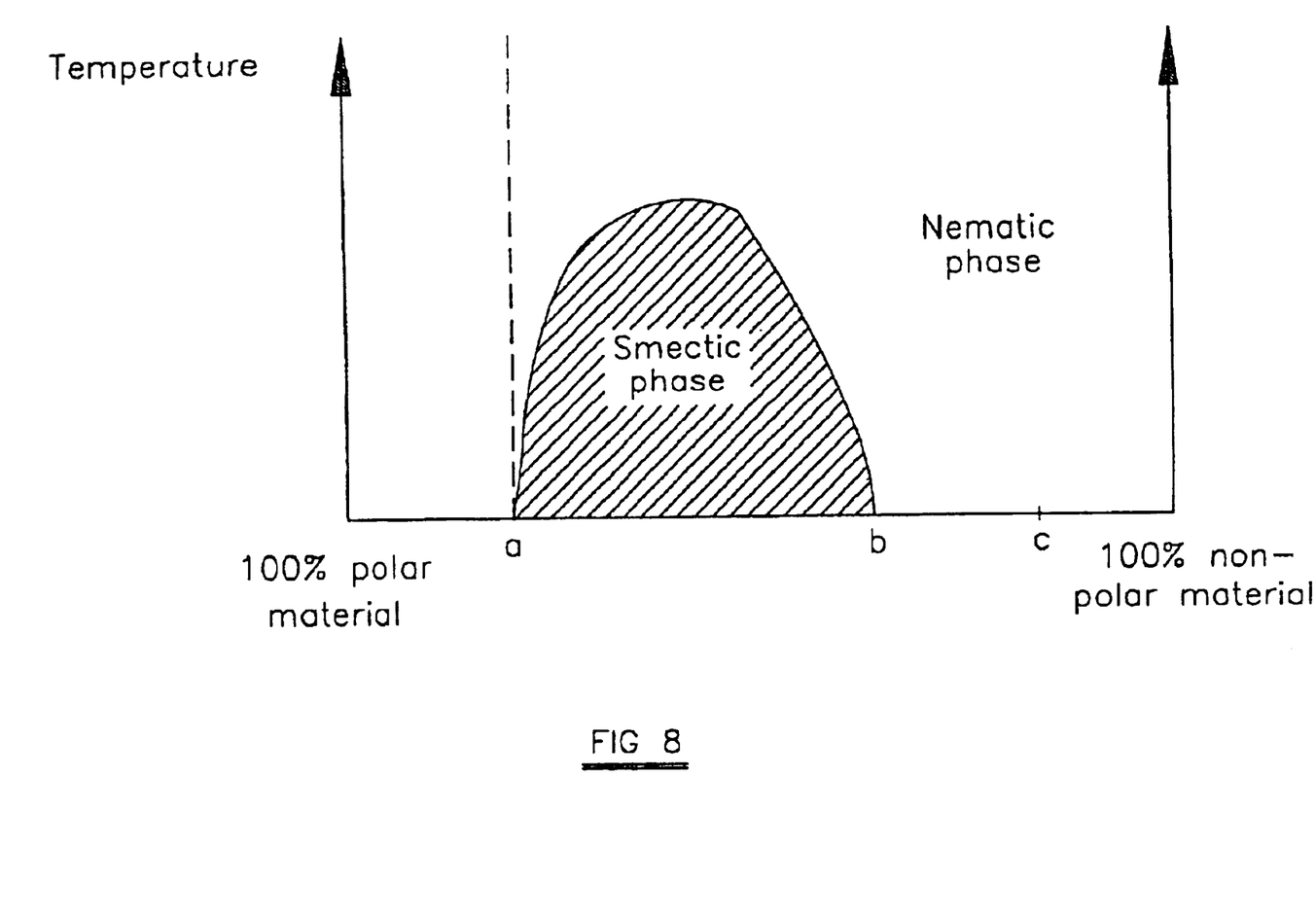
FIG. 8 is a phase diagram of a suitable liquid crystal material.

It is desirable to have a nematic material which is close to a phase transition to a smectic material across as wide a range of temperature as possible. Pi-cells of the type shown in the drawings using such materials may be expected to show unusual temperature dependence of their viscosities through their advantageous i.e. non-unity, values of the parameter $(\eta_1-\eta_2\gamma_1$. A method to achieve nematic materials which are close to a phase transistion to a smectic material across a wide range of temperatures is described by C.S.Oh, "Induced Smectic Mesomorphism by Incompatible Nematogens", Mol. Cryst. Liq. Cryst. 1977, Vol. 42, pp. 1–4, and M. J. Bradshaw, E. P. Raynes "The Bend and Splay Elastic Constants on Approaching an Injected Smectic Phase", Mol. Cryst. Liq. Cryst., 1983, Vol. 99, pp. 107–116. FIG. 8 shows a phase diagram of the type discussed in these references. A mixture of polar nematic molecules (such as 4-cyano-4'-n-pentylbiphenyl-biphenyl) with non-polar nematic molecules (such as 4'-n-hexyloxyphenyl-4n-butyl-benzoate) can result in the appearance of a smectic phase at some concentrations (i.e. between concentrations 'a' and 'b' in FIG. 8). A mixture at 'c' shows a purely nematic phase over a wide temperature range. However, a mixture at 'a' (or 'b') although nematic is close to a transition to a smectic phase across a wide temperature range.

It is believed that another possible technique for achieving some weak smectic ordering into an otherwise nematic system involves the use of polymer networks, for example as follows. A mixture of a nematic liquid crystal and a reactive mesogen is formed. The nematic liquid crystal possesses an underlying smectic phase at a temperature below the normal operating range of the device. The mixture is cooled so that the liquid crystal undergoes the transition to the smectic phase and the reactive mesogen is then exposed to ultraviolet radiation, thus inducing polymerization and creating an anisotropic polymer network. The anisotropic ordering of the polymer network then forms a permanent record of its alignment in the smectic liquid crystal. The device is then returned to ambient temperature with the liquid crystal returning to the nematic phase. At ambient temperature, the device comprises a nematic liquid crystal together with a polymer network with some degree of smectic ordering. Such a system may therefore provide a technique for creating the desired nematic liquid crystal system displaying some degree of smectic ordering.

Various modification may be made within the scope of the invention. For example, the polarisers 1 and 5 may be oriented such that their polarisation axes 11 and 14 are parallel. In this case, the black and white states of the pixels are reversed. Also, although FIGS. 3 and 6 illustrate transmission mode devices, reflection mode devices may also be provided. In this case, the polariser 5 may be replaced by a mirror and the retardations of the layer 10 and the retarder 6 may be chosen so that the device operates as a switchable quarter wave retarder.

What is claimed is:

1. A surface mode liquid crystal device comprising a layer of nematic liquid crystal having viscosity coefficients $\eta_1$, $\eta_2$ and $\gamma_1$ such that $(\eta_1-\eta_2)/\gamma_1 \geq 1.15$ or $(\eta_1-\eta_2)/\gamma_1 \leq 0.9$, wherein $\eta_1$ refers to a director parallel to velocity gradient, $\eta_2$ refers to a director parallel to flow direction, and $\gamma_1$ refers to rotational viscosity.

2. A device as claimed in claim 1, in which the liquid crystal shows a nematic phase at at least one temperature in the range 0–60° C.

3. A device as claimed in claim 1, in which the nematic liquid crystal has an underlying smectic phase.

4. A device as claimed in claim 1, in which the liquid crystal layer comprises a polymer network formed by polymerisation of a polymerisable material with the layer cooled to a temperature at which the nematic liquid crystal has a smectic phase.

5. A device as claimed in claim 1, in which the liquid crystal has positive dielectric anisotropy and is disposed between first and second alignment layers providing substantially parallel alignment and a pretilt less than 45°.

6. A device as claimed in claim 5, in which the pretilt is Less than 10°.

7. A device at claimed in claim 1, in which the liquid crystal has negative dielectric anisotropy and is disposed between first and second alignment layers providing substantially parallel alignment and a pretilt greater than 45°.

8. A device as claimed in claim 7, in which the pretilt is greater than 80°.

9. A device as claimed in claim 7, in which $(\eta_1-\eta_2)/\gamma_1<0$.

10. A display comprising a device as claimed in claim 1.

11. A surface mode liquid crystal device comprising a layer of nematic liquid crystal having viscosity coefficients $\eta_1$, $\eta_2$ and $\gamma_1$ such that $(\eta_1-\eta_2)/\gamma_1 \geq 1.15$ or $(\eta_1-\eta_2)/\gamma_1 \leq 0.9$ at a temperature such that the liquid crystal is at least 5° C. away from a transition to another phase, wherein $\eta_1$ refers to a director parallel to velocity gradient, $\eta_2$ refers to a director parallel to flow direction, and $\gamma_1$ refers to rotational viscosity.

12. A device a claimed in claim 11, in which the another phase is a smectic phase.

* * * * *